United States Patent [19]

Meinzer et al.

[11] Patent Number: 4,517,676
[45] Date of Patent: May 14, 1985

[54] MULTI-SPECIES, CW COMBUSTION DRIVEN LASER EMPLOYING HYDROGEN BROMIDE

[75] Inventors: Richard A. Meinzer, Newington; Gregory M. Dobbs, Glastonbury, both of Conn.

[73] Assignee: United Technologies Corporation, Hartford, Conn.

[21] Appl. No.: 469,187

[22] Filed: Feb. 24, 1983

Related U.S. Application Data

[63] Continuation of Ser. No. 223,639, Jan. 9, 1981, abandoned.

[51] Int. Cl.³ .............................................. H01S 3/095
[52] U.S. Cl. ...................................... 372/89; 372/60; 372/59; 372/68
[58] Field of Search ...................... 372/89, 55, 57, 58, 372/61, 59, 60, 68

[56] References Cited

U.S. PATENT DOCUMENTS 4,217,557 8/1980 Foster et al. .......................... 372/89

OTHER PUBLICATIONS

Miller et al., "Chemical Production of Vibrationally Excited HBr for a Continuous Wave Laser", Appl. Phys. Lett. 35 (7), Oct. 1, 1979, pp. 506-508.
Arnold et al., "A Purely Chemical HBr Laser", Appl. Phys. Lett. 33 (8), Oct. 15, 1978.

Primary Examiner—William L. Sikes
Assistant Examiner—Léon Scott
Attorney, Agent, or Firm—Eric W. Petraske

[57] ABSTRACT

A combustion driven laser employs HBr as one of a plurality of lasing species. One embodiment of the invention lases simultaneously on the three species HF, HCl, HBr.

3 Claims, 2 Drawing Figures

MULTI-SPECIES, CW COMBUSTION DRIVEN LASER EMPLOYING HYDROGEN BROMIDE

CROSS REFERENCE TO RELATED APPLICATIONS

This is a continuation of application Ser. No. 223,639, now abandoned.

TECHNICAL FIELD

The technical field of the invention is that of CW combustion-driven lasers.

BACKGROUND ART

U.S. Pat. No. 3,959,741, issued to Richard A. Meinzer on May 25, 1976 and incorporated herein by reference, discloses an interhalogen combustion-driven laser in which simultaneous lasing occurs on two chemical species. One embodiment employs HF and HBr as the lasing species, formed by the reaction $F_2 + \frac{1}{2}Br_2 \rightarrow BrF + F$ in the primary (high temperature and pressure) reaction zone, followed by the reactions:

$$F + H \rightarrow HF^* + H$$

$$H + BrF \rightarrow HBr^* + F$$

$$\rightarrow HF^* + Br$$

in the secondary reaction zone.

U.S. Pat. No. 4,217,557, issued on Aug. 12, 1980 to Kenneth D. Foster et al., discloses a subsonic HBr laser in which combustion occurs at low pressure and in which the HBr is produced by a different reaction from that disclosed in Meinzer U.S. Pat. No. 3,959,741.

DISCLOSURE OF INVENTION

The invention relates to a chemical laser employing HBr as one of a plurality of lasing species. In a preferred embodiment of the invention HBr is formed in part by reacting atomic hydrogen with bromine.

BEST MODE FOR CARRYING OUT THE INVENTION

Figure 1:
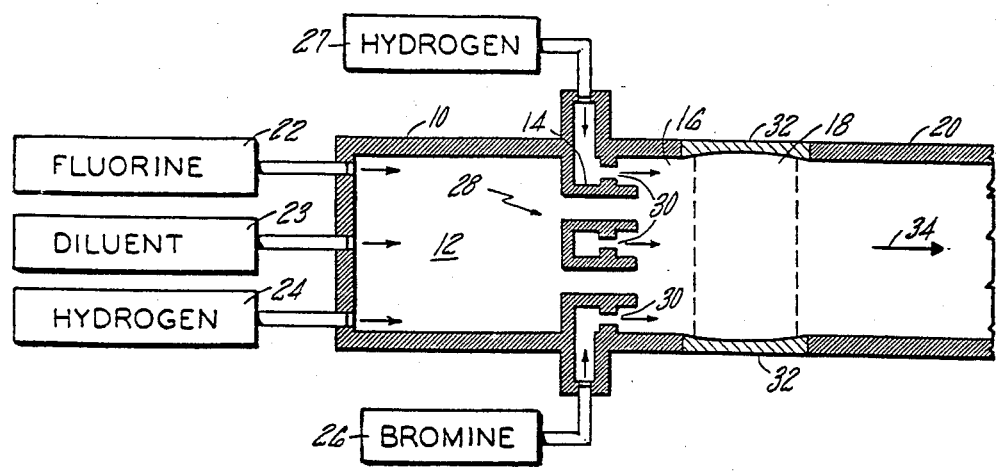
FIG. 1 illustrates an embodiment of the invention in which simultaneous lasing action occurs on HF and HBr.

In FIG. 1, outer housing 10 forms a first reaction region 12, a nozzle region 14, a second reaction region 16, an optical cavity 18 and an exhaust region 20. Fresh reactants are supplied to reaction region 12 by fluorine source 22 and hydrogen source 24. Nitrogen, helium or some other diluent is provided to control the temperature by source 23. Operation without a diluent was demonstrated with a 25% power loss. Reactants are supplied to the nozzle by hydrogen source 27 and bromine source 26. In operation, the hydrogen and fluorine react spontaneously to form HF, releasing sufficient energy to dissociate a portion of the excess fluorine. Reaction region 12 is at thermodynamic equilibrium, typically at 0.5 atmospheres and 1500° K.

In nozzle region 14, similar to that of the above-mentioned Meinzer patent, the gases flowing from region 12 are expanded supersonically and combined intimately with the additional supersonically expanded secondary gases. The active species lase as they traverse optical cavity 18, bounded by mirrors 32. The effluent from the cavity flowing in a downstream direction 23 is then removed from exhaust region 20 by conventional pumping means not shown.

The figure shows a cross section of a simplified array 28 of nozzle assemblies, in which passages extending from region 12 to region 16 are placed in close proximity to tubes 30 extending from sources 26 and 27, thus providing intimate mixing of all reactants in second reaction region 16.

As a result of the supersonic expansion through nozzle region 14, the gas temperature and pressure is reduced, the HF is "frozen" in a population inversion and the atomic fluorine is available to react with the injected $H_2$ and $Br_2$.

The above-mentioned Meinzer patent teaches that a dual-species HBr-HF laser may be formed by means of the reactions $F_2 + \frac{1}{2}Br_2 \rightarrow BrF + F$ in the first reaction region and $$F + H_2 \rightarrow HF^* + H$$

$$H + BrF \rightarrow HBr^* + F$$

$$\rightarrow HF^* + Br$$

in the second reaction region. It has been found, unexpectedly, that the foregoing reaction produces much less power than the reactions:

$$F_2 + H_2 \rightarrow 2HF$$

$$F_2 \rightarrow 2F \quad \text{in the first region and}$$

$$H_2 + F \rightarrow HF^* + H$$

$$H + Br_2 \rightarrow HBr^* + Br$$

in the second reaction region. Output power from HBr is greater by a factor of more than 100 when the $Br_2$ is injected in the second reaction region. The reactions $$F + \frac{1}{2} Br_2 \rightarrow BrF + Br$$

$$H + BrF \rightarrow HBr^* + F$$

$$\rightarrow HF^* + Br$$

also take place in the second reaction region. The relative amounts of HBr that are produced by the two sets of reactions depend on the operating conditions. For the preferred embodiment, current calculations are that only 10% of the HBr is formed by reaction of H with BrF.

The flow rates for the preferred HBr embodiment are: first reaction region-$H_2 = 0.0228$ moles/sec, $F_2 = 0.0319$ moles/sec, $N_2$ (diluent) $= 0.1443$ moles/sec; second reaction region-$H_2 = 0.7913$ moles/sec, $Br_2 = 0.0148$ moles/sec, which parameters gave a power output of 100 watts. Static temperature of the upstream end of the second reaction region is approximately 200° K. and static pressure in this reaction region may vary between 1 and 4 torr without significantly affecting the power output. Pressure in the first reaction region was 360 torr and is not critical. Output power was linear as a function of first reaction region pressure and of nitrogen diluent flow in the range 0.06–0.15 moles/sec; insensitive to primary hydrogen flow in the range 0.016–0.024 moles/sec; insensitive to secondary hydrogen flow in the range 0.5–0.8 moles/sec and linear as a function of secondary bromine flow in the range 0.006–0.014 moles/sec.

Figure 2:
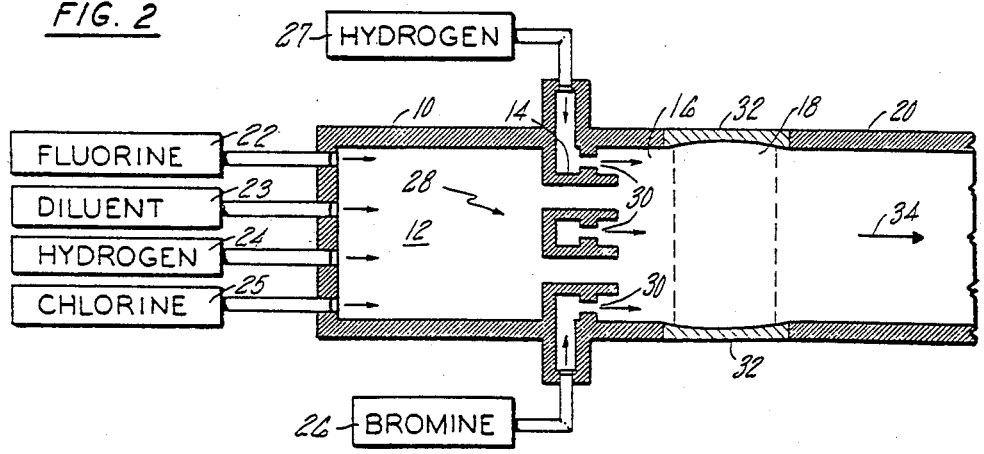
FIG. 2 illustrates an embodiment of the invention in which simultaneous lasing occurs on HF, HCl and HBr.

In FIG. 2, an embodiment in which simultaneous lasing occurs on HF, HCl and HBr is illustrated. Chlorine is added from source 25 to first reaction region 12. Operating parameters for this embodiment are: first reaction region-$D_2$=0.00764 moles/sec, $F_2$=0.029 moles/sec, He=0.0178 moles/sec, $Cl_2$=0.005 moles/sec; second reaction region-$H_2$=0.0656 moles/sec and $Br_2$=0.007 moles/sec. Pressure in the first reaction region was 48 torr and that in the second reaction region was 0.2 torr. The $D_2$ reacts with the $F_2$ in the first region to form DF and to dissociate some of the $F_2$. Simultaneously, $Cl_2$ and $F_2$ react to form ClF. The hydrogen which forms the lasing species is added through the tubes 30 in nozzle array 28.

An advantage of both these embodiments is that the additional species lase on lines that extend the wavelength region covered by the laser output and also fill the region more densely. HF lases in the region 2.3 to 3.0 microns, HCl lases in the region 3.6 to 4.1 microns and HBr lases in the region 4.0 to 4.7 microns. Radiation emission over a broad wavelength range is useful for providing radiation of some particular frequency, in particular for pumping a tunable laser for use in isotope separation, as disclosed in U.S. Pat. No. 3,810,042.

It is not necessary for the practice of the invention that the reactants be in the form $F_2$, $H_2$, $Br_2$, etc. and other compounds such as nitrogen trifluoride, benzene and bromine trifluoride will be readily apparent to those skilled in the art. Additional wavelength range may be provided by using a mixture of hydrogen and deuterium as a reactant and the term hydrogen as used herein shall be understood to include all isotopes of hydrogen, singly or in combination. By selecting the dichroic mirror coatings on mirrors 32, the lasing action can be confined to HBr, if that is desired for some particular application.

We claim:

1. A method of generating radiation in a laser system having at least two different compounds lasing simultaneously comprising the steps of:
    mixing a first gas containing fluorine and a second gas containing hydrogen to form atomic fluorine and vibrationally excited hydrogen fluoride in a first reaction region;
    passing said hydrogen fluoride and atomic fluorine through an expansion nozzle to a second reaction region;
    mixing intimately molecular hydrogen and a gas containing bromine with said atomic fluorine and hydrogen fluoride in said second reaction region, whereby vibrationally excited hydrogen bromide is formed; and
    resonating radiation emitted from said vibrationally excited hydrogen bromide and said vibrationally excited hydrogen fluoride in an optical cavity, wherein the improvement comprises:
    reacting said molecular hydrogen with fluorine to form vibrationally excited hydrogen fluoride and atomic hydrogen in said second reaction region; and
    reacting said atomic hydrogen directly with molecular bromine in said second reaction region to form said vibrationally excited hydrogen bromide.

2. A method according to claim 1, in which said first gas is molecular fluorine and said second gas is molecular hydrogen.

3. A method according to claim 1, further improved by adding a third gas containing chlorine to said first reaction region and reacting chlorine with fluorine to form vibrationally excited chlorine fluoride in addition to said vibrationally excited hydrogen fluoride, and reacting chlorine fluoride with said atomic hydrogen to form vibrationally excited hydrogen chloride, whereby radiation from vibrationally excited hydrogen chloride, hydrogen fluoride and hydrogen bromide is resonated simultaneously in said optical cavity.

* * * * *